(12) United States Patent
Magne et al.

(10) Patent No.: US 9,917,446 B2
(45) Date of Patent: Mar. 13, 2018

(54) SELF REGULATED POWER CONVERTER (71) Applicant: SCHNEIDER ELECTRIC SOLAR INVERTERS USA, INC., Livermore, CA (US)

(72) Inventors: Pierre Remi Magne, Vancouver (CA); Masautso Ngosi, Port Coquitlam (CA); Dhaval Shah, Burnaby (CA)

(73) Assignee: SCHNEIDER ELECTRIC SOLAR INVERTERS USA, INC., Livermore, CA (US)

( * ) Notice: Subject to any disclaimer, the term of this patent is extended or adjusted under 35 U.S.C. 154(b) by 125 days.

(21) Appl. No.: 15/012,168

(22) Filed: Feb. 1, 2016

(65) Prior Publication Data
US 2017/0222438 A1 Aug. 3, 2017

(51) Int. Cl.
*H02J 3/38* (2006.01)
*H02J 7/00* (2006.01)

(52) U.S. Cl.
CPC .............. *H02J 3/383* (2013.01); *H02J 7/007* (2013.01); *H02J 7/0068* (2013.01)

(58) Field of Classification Search
CPC .......... H02J 3/383; H02J 7/0068; H02J 7/007
See application file for complete search history.

(56) References Cited

U.S. PATENT DOCUMENTS 8,159,178 B2 4/2012 Serban
2013/0049471 A1 2/2013 Oleynik et al.

FOREIGN PATENT DOCUMENTS

WO 20150026343 A1 2/2015
WO 2015063234 A1 5/2015
WO 20150102598 A1 7/2015

*Primary Examiner* — Robert Deberadinis
(74) *Attorney, Agent, or Firm* — Lando & Anastasi, LLP (57) ABSTRACT

According to one aspect, embodiments herein provide a power converter configured to monitor at least one of current and voltage at a bidirectional AC load terminal, determine, based on the monitoring, whether the power converter is receiving AC power from at least one Photo-Voltaic (PV) inverter or whether AC power is being drawn from the power converter by at least one load, determine whether an energy storage device coupled to the power converter is fully charged, and in response to a determination that the power converter is receiving power from the at least one PV inverter and a determination that the energy storage device is not fully charged, operate a power conversion unit in the power converter to convert the AC power received from the at least one PV inverter into DC power and provide the DC power to a bidirectional DC terminal to charge the energy storage device.

23 Claims, 4 Drawing Sheets

SELF REGULATED POWER CONVERTER

BACKGROUND OF THE INVENTION

Field of the Invention

At least one example in accordance with the present invention relates generally to Photovoltaic (PV) inverters.

Discussion of Related Art

A Photovoltaic (PV) (i.e., solar) inverter is traditionally utilized to convert the DC output of a PV solar panel into an AC output that can be fed into an electrical grid or used by a local, off-grid, electrical network.

SUMMARY

Aspects in accord with the present invention are directed to a power converter comprising: at least one bidirectional AC grid terminal configured to be coupled to an AC grid, a bidirectional AC load terminal configured to be coupled to at least one Photo-Voltaic (PV) inverter and at least one load, a power conversion unit coupled to the at least one bidirectional AC grid terminal and the bidirectional AC load terminal, a bidirectional DC terminal configured to be coupled to an energy storage device, and a controller coupled to the power conversion unit and the bidirectional AC load terminal and configured to monitor at least one of current and voltage at the bidirectional AC load terminal, determine, based on the monitoring, whether the power converter is receiving AC power from the at least one PV inverter or whether AC power is being drawn from the power converter by the at least one load, determine whether the energy storage device is fully charged, and in response to a determination that the power converter is receiving power from the at least one PV inverter and a determination that the energy storage device is not fully charged, operate the power conversion unit to convert the AC power received from the at least one PV inverter into DC power and provide the DC power to the bidirectional DC terminal to charge the energy storage device.

According to one embodiment, in operating the power conversion unit to convert the AC power received from the at least one PV inverter into DC power and provide the DC power to the bidirectional DC terminal, the controller is further configured to identify a charging cycle specific to the energy storage device, and operate the power conversion unit to charge the energy storage device in a charging stage based on the charging cycle specific to the energy storage device. In one embodiment, in identifying a charging cycle specific to the energy storage device, the controller is further configured to identify the charging cycle as one of a 3-stage, 2-stage, constant current, and constant voltage charging cycle. In another embodiment, the power converter further comprises at least one sensor coupled to the controller and the bidirectional AC load terminal.

According to another embodiment, the controller is further configured to store an identification of the charging stage and an identification of a state of the energy storage device in memory. In one embodiment, in response to a determination that the power converter is receiving power from the at least one PV inverter, the controller is further configured to retrieve the previously stored identification of the charging stage and the previously stored identification of the state of the energy storage device from memory, compare the previously stored identification of the state of the energy storage device with a current identification of the state of the energy storage device, and operate the power conversion unit to charge the energy storage device in the charging stage in response to a determination that the previously stored identification of the state of the energy storage is the same as the current identification of the state of the energy storage device.

According to one embodiment, the controller is further configured to determine whether the at least one bidirectional AC grid terminal is coupled to the AC grid. In one embodiment, in response to the determination that the power converter is receiving power from the at least one PV inverter, a determination that the energy storage device is fully charged, and a determination that the at least one bidirectional AC grid terminal is coupled to the AC grid, the controller is further configured to operate the power converter to provide the AC power received from the at least one PV inverter to the AC grid via the at least one bidirectional AC grid terminal.

According to another embodiment, in operating the power converter to provide the AC power received from the at least one PV inverter to the AC grid, the controller is further configured to determine whether the AC power received from the at least one PV inverter complies with at least one grid requirement, and in response to a determination that the AC power received from the at least one PV inverter complies with the at least one grid requirement, operate the power converter to provide the AC power received from the at least one PV inverter to the AC grid. In one embodiment, the at least one grid requirement defines a period of time in which the AC power received from the at least one PV inverter can be provided to the AC grid. In another embodiment, in response to a determination that the AC power received from the at least one PV inverter does not comply with the at least one grid requirement, the controller is further configured to operate the power converter to disconnect from the AC grid and shift an AC frequency at the bidirectional AC load terminal such that the AC power received from the at least one PV inverter is reduced.

According to one embodiment, in response to the determination that the power converter is receiving power from the at least one PV inverter, the determination that the energy storage device is fully charged, and a determination that the at least one bidirectional AC grid terminal is not coupled to the AC grid, the controller is further configured to operate the power converter to shift an AC frequency at the bidirectional AC load terminal such that the AC power received from the at least one PV inverter is reduced. In another embodiment, in response to a determination that AC power is being drawn from the power converter by the at least one load and a determination that the at least one bidirectional AC grid terminal is not coupled to the AC grid, the controller is further configured to operate the power conversion unit to draw DC power from the energy storage device via the bidirectional DC terminal, convert the DC power into output AC power, and provide the output AC power to the at least one load via the bidirectional AC load terminal.

According to another embodiment, in response to a determination that AC power is being drawn from the power converter by the at least one load and a determination that the at least one bidirectional AC grid terminal is coupled to the AC grid, the controller is further configured to operate the power converter to draw AC power from the AC grid and provide the AC power from the AC grid to the at least one load via the bidirectional AC load terminal. In one embodiment, in response to a determination that AC power is being drawn from the power converter by the at least one load, a determination that the at least one bidirectional AC grid terminal is coupled to the AC grid, and a determination that the energy storage device is not fully charged, the controller is further configured to operate the power conversion unit to convert the AC power from the AC grid into DC power and provide the DC power to the bidirectional DC terminal to charge the energy storage device. In another embodiment, in response to a determination that AC power is being drawn from the power converter by the at least one load, a determination that the at least one bidirectional AC grid terminal is coupled to the AC grid, and a determination that the energy storage device is not fully charged, the controller is further configured to operate the power converter to draw AC power from the AC grid and provide the AC power from the AC grid to the at least one load via the bidirectional AC load terminal.

Another aspect in accord with the present invention is directed to a method for operating a power converter having at least one bidirectional AC grid terminal configured to be coupled to an AC grid, a bidirectional AC load terminal configured to be coupled to at least one Photo-Voltaic (PV) inverter and at least one load, a power conversion unit coupled to the at least one bidirectional AC grid terminal and the bidirectional AC load terminal, and a bidirectional DC terminal configured to be coupled to an energy storage device, the method comprising acts of monitoring at least one of current and voltage at the bidirectional AC load terminal, determining, based on the act of monitoring, whether the power converter is receiving AC power from the at least one PV inverter or whether AC power is being drawn from the power converter by the at least one load, determining whether the energy storage device is fully charged, and in response to a determination that the power converter is receiving power from the at least one PV inverter and a determination that the energy storage device is not fully charged, operating the power conversion unit to convert the AC power received from the at least one PV inverter into DC power and provide the DC power to the bidirectional DC terminal to charge the energy storage device.

According to one embodiment operating the power conversion unit to convert the AC power received from the at least one PV inverter into DC power and provide the DC power to the bidirectional DC terminal includes identifying a charging cycle specific to the energy storage device, and operating the power conversion unit to charge the energy storage device based on the charging cycle specific to the energy storage device. In another embodiment, the method further comprises determining whether the at least one bidirectional AC grid terminal is coupled to the AC grid, in response to a determination that the power converter is receiving power from the at least one PV inverter, a determination that the energy storage device is fully charged, and a determination that the at least one bidirectional AC grid terminal is coupled to the AC grid, operating the power converter to provide the AC power received from the at least one PV inverter to the AC grid via the at least one bidirectional AC grid terminal, and in response to the determination that the power converter is receiving power from the at least one PV inverter, the determination that the energy storage device is fully charged, and a determination that the at least one bidirectional AC grid terminal is not coupled to the AC grid, operating the power converter to curtail the power received from the at least one PV inverter.

According to another embodiment, operating the power converter to provide the AC power received from the at least one PV inverter to the AC grid includes determining whether the AC power received from the at least one PV inverter complies with at least one grid requirement, in response to a determination that the AC power received from the at least one PV inverter complies with the at least one grid requirement, operating the power converter to provide the AC power received from the at least one PV inverter to the AC grid, and in response to a determination that the AC power received from the at least one PV inverter does not comply with the at least one grid requirement, operating the power converter to curtail the AC power received from the at least one PV inverter.

According to one embodiment, the method further comprises in response to a determination that AC power is being drawn from the power converter by the at least one load and a determination that the at least one bidirectional AC grid terminal is not coupled to the AC grid, operating the power conversion unit to draw DC power from the energy storage device via the bidirectional DC terminal, convert the DC power into output AC power, and provide the output AC power to the at least one load via the bidirectional AC load terminal. In another embodiment, the method further comprises in response to a determination that AC power is being drawn from the power converter by the at least one load and a determination that the at least one bidirectional AC grid terminal is coupled to the AC grid, operating the power converter to draw AC power from the AC grid and provide the AC power from the AC grid to the at least one load via the bidirectional AC load terminal.

At least one aspect in accord with the present invention is directed to a power supply system comprising a first interface configured to be coupled to an AC grid, a second interface configured to be coupled to at least one load, a power converter coupled to the first interface and the second interface, a renewable energy based inverter coupled to the second interface, an energy storage device coupled to the power converter, and means for determining if power generated by the renewable energy based inverter is sufficient to power the at least one load, for operating the power converter to charge the energy storage device with excess power generated by the renewable energy based inverter if the power generated by the renewable energy based inverter exceeds power required by the at least one load and the energy storage device is not fully charged, for operating the power converter to provide the excess power generated by the renewable energy based inverter to the AC grid if the energy storage device is fully charged, and for operating the power converter to provide AC power from the AC grid to the at least one load if the power generated by the renewable energy based inverter is less than the power required by the at least one load.

BRIEF DESCRIPTION OF THE DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As described above, PV inverters are commonly utilized to convert the DC output of a PV solar panel into an AC output that can be fed into an electrical grid or used by a local, off-grid, electrical network. For example, in a traditional PV inverter configuration, a PV inverter is coupled directly to an electrical grid (e.g., utility grid) and AC power generated by the PV inverter (based on DC power received from a PV solar panel) is provided to (i.e., sold to) the grid. AC power may be drawn from (i.e., purchased from) the grid by a power converter and provided to loads coupled to the converter. In such an embodiment, the PV inverter operates based on an AC voltage reference from the electrical grid and if the electrical grid fails, the PV inverter may also fail. In addition, the selling of PV electric power to the grid and the purchasing of AC power back from the grid is typically a costly, inefficient, and cumbersome process (e.g., due to the required communications and transfer of energy between components of the system).

A self-regulated power converter is provided that is capable of receiving AC power directly from a PV inverter, enabling self-consumption of locally generated electric power (i.e., PV electric power) while achieving smart control of the charge/discharge cycles of an energy storage device coupled to the converter, and enabling the control of energy sold to an AC grid. The self-regulated power converter described herein provides cost-effective and efficient energy management control between an AC grid, the PV inverter, an energy storage device coupled to the converter, and any loads coupled to the converter.

Figure 1:
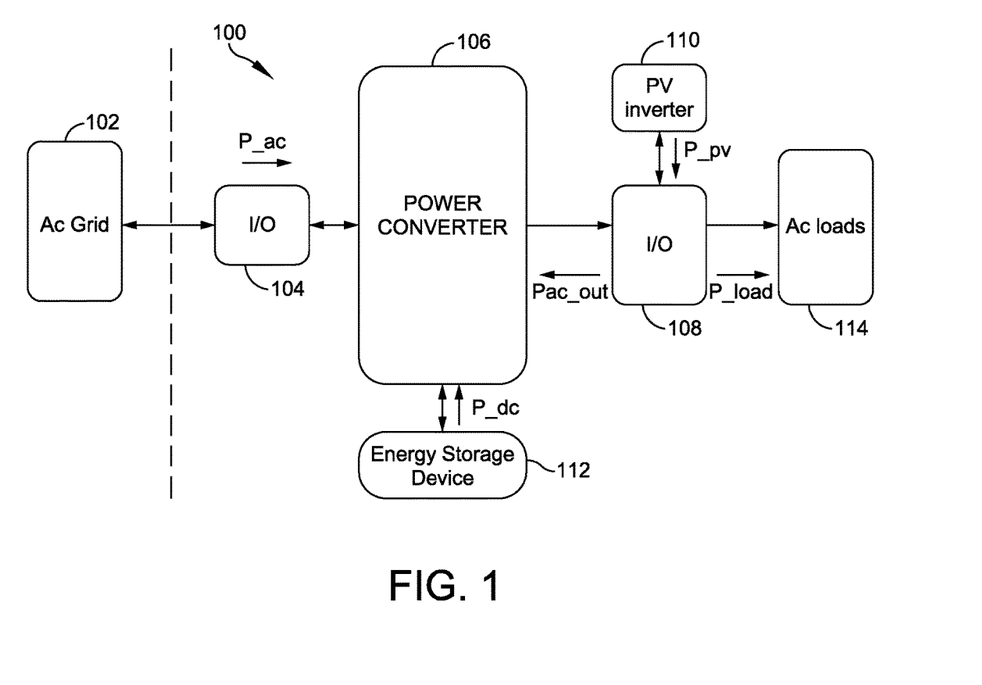
FIG. 1 is a block diagram of a power supply system in accordance with aspects of the present invention.

FIG. 1 is a block diagram of a power supply system 100 according to aspects described herein. The power supply system 100 includes a first I/O interface 104, a power converter 106, a second I/O interface 108, a PV inverter 110, and an energy storage device 112. The first I/O interface 104 is configured to couple the power converter 106 to an AC grid 102 (e.g., a utility grid). The second I/O interface 108 is configured to couple the power converter 106 to one or more AC loads 114. The second I/O interface 108 is also configured to couple the PV inverter 110 to the power converter 106 and/or the AC loads 114. The power converter 106 is also coupled to the energy storage device 112.

Figure 2:
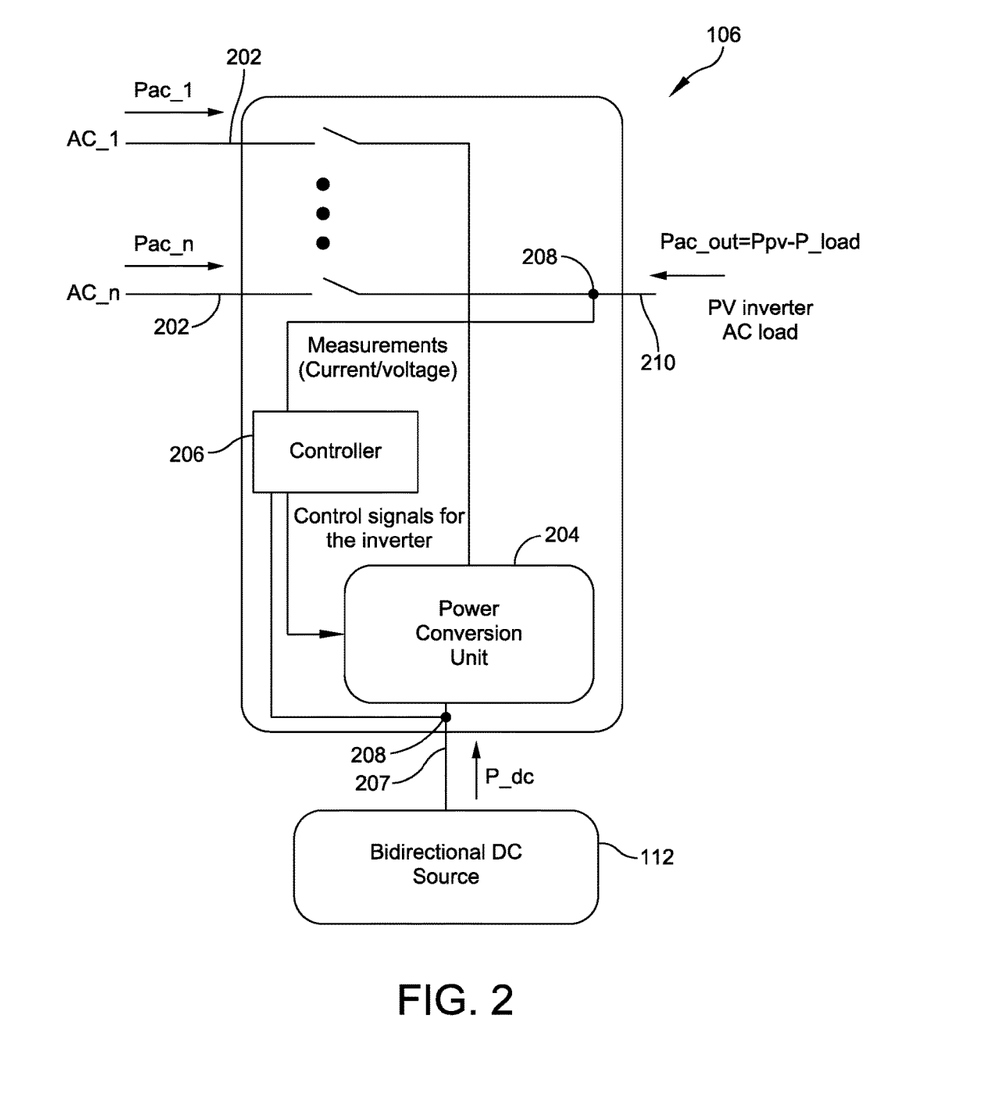
FIG. 2 is a block diagram of a power converter in accordance with aspects of the present invention.

FIG. 2 is a more detailed block diagram of the power converter 106. The power converter 106 includes at least one bidirectional AC grid terminal 202, a power conversion unit 204, a controller 206, a bidirectional DC terminal 207, at least one sensor 208, and a bidirectional AC load terminal 210. The at least one bidirectional AC grid terminal 202 is configured to be coupled to an AC source (e.g., the AC grid 102) via the first I/O interface 104. In some embodiments, the power converter 106 may include any number (n) of bidirectional AC terminals 202 that are configured to be coupled to any number of AC sources. The bidirectional AC terminal(s) 202 are coupled to the power conversion unit 204 and the bidirectional AC load terminal 210.

The at least one sensor 208 may include any number of different sensors that are located at any number of different locations within the power converter 106. For example, in one embodiment, the at least one sensor 208 includes a voltage and/or current sensor coupled to the bidirectional AC load terminal 210. In another embodiment, the at least one sensor 208 includes a voltage and/or current sensor coupled to the bidirectional DC terminal 207. In other embodiments, the at least one sensor 208 may include any number and/or type of sensors coupled to any appropriate locations within the power converter 106. The controller 206 is coupled to each sensor 208 and the power conversion unit 204. The power conversion unit 204 is also configured to be coupled to the energy storage device 112 via the bidirectional DC terminal 207. In one embodiment, the power conversion unit 204 includes a bidirectional AC-DC converter; however, in other embodiments, the power conversion unit 204 may be configured differently. The bidirectional AC load terminal 210 is configured to be coupled to the at least one AC load 114 and the PV inverter 110 via the second I/O interface 108.

Figure 3:
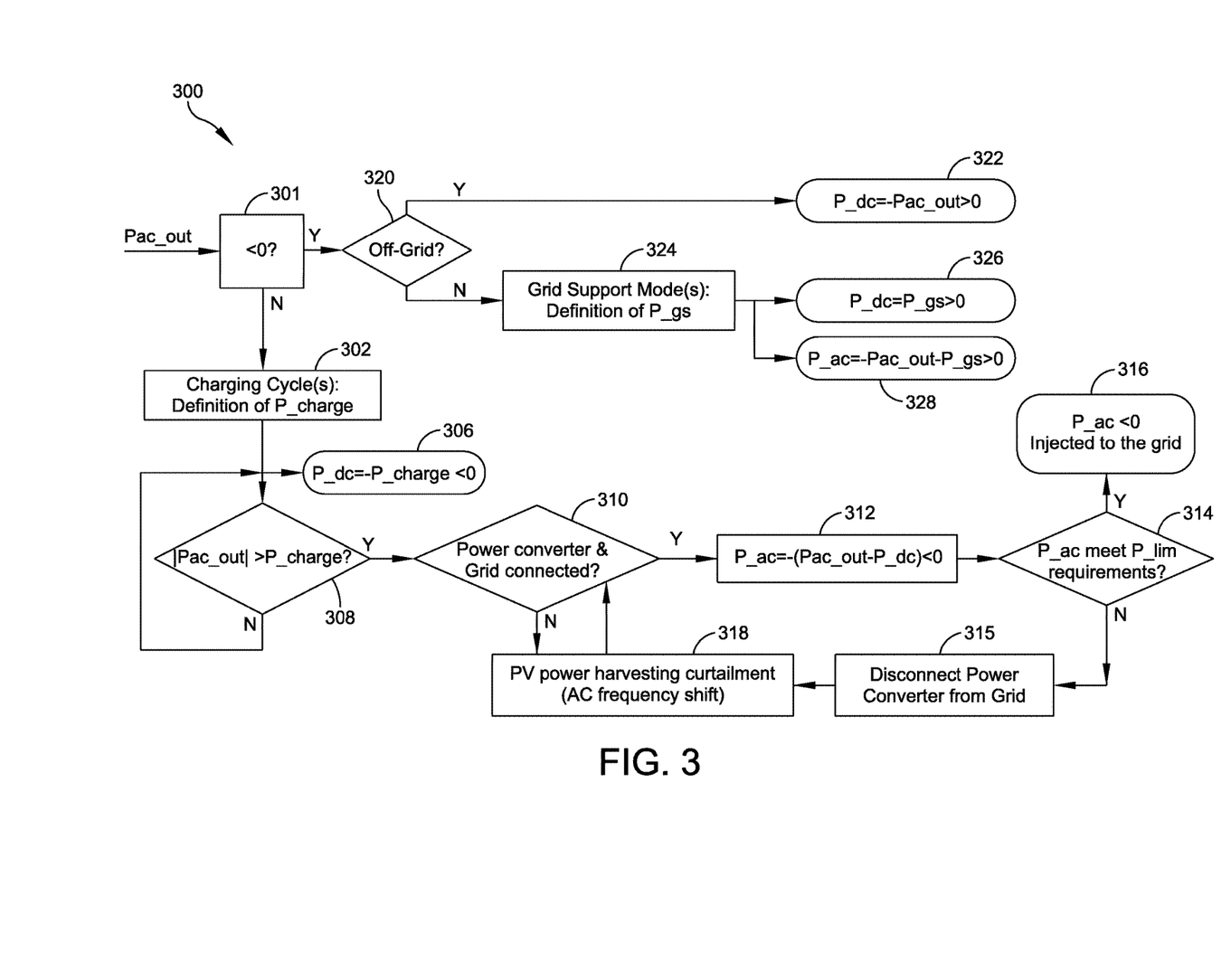
FIG. 3 is a flow chart illustrating operation of a power converter in accordance with aspects of the present invention.

The power supply system 100 operates to provide power to the AC loads 114 derived from AC power provided by the AC grid 102, DC power provided by the energy storage device 112, and/or AC power provided by the PV inverter 110. The controller 206 embedded in the converter 106 operates the converter 106 to control the transfer of energy between the AC grid 102, the PV inverter 110, the energy storage device 112, and the AC loads 114, based on the status of the AC grid 102, the PV inverter 110, and the energy storage device 112. For example, operation of the power converter 106 is discussed below with respect to FIG. 3. FIG. 3 is a flow chart 300 illustrating operation of the power converter 106.

At block 302, the controller 206 monitors (e.g., via a voltage and/or current sensor 208) the output power (Pac_out) of the power converter 106. The output power (Pac_out) of the power converter 106 is equal to the difference between the output power (P_pv) of the PV inverter 110 and the output power (P_load) provided to the loads 114. If the output power (P_pv) of the PV inverter 110 is greater than the output power (P_load) provided to the loads 114, the PV inverter 110 also provides power to the power converter 106 (e.g., seen by the controller 206 as a positive Pac_out). If the output power (P_pv) of the PV inverter 110 is less than the output power (P_load) provided to the loads 114, power is provided by the power converter 106 (e.g., derived from the AC grid 102 or the energy storage device 112) to the AC loads 114 to account for the power deficiency of the PV inverter 110. Such power drawn by the AC loads 114 from the power converter 106 is seen by controller 206 as a negative Pac-out).

At block 301, the controller 206 determines whether the power converter 106 is receiving power from the PV inverter 110 or whether power is being drawn by the AC loads 114 from the power converter 106 (i.e., whether Pac-out is positive or negative as described above). In response to a determination that the power converter 106 is receiving power from the PV inverter 110 (e.g., Pac_out is positive), at block 302, the controller engages the power converter 106 and identifies the appropriate charging cycle corresponding to the energy storage device 112 coupled to the bidirectional DC terminal 207 of the power converter 106. The charging cycle is specific to the type of energy storage device 112 coupled to the converter 106 (e.g., based on chemistry, ratings, etc.) and defines the appropriate charging power (P_charge) that should be applied to the energy storage device 112 along with additional charging information associated with the device 112. For example, in one embodiment, the charging cycle is a three state cycle including bulk, absorption and float modes. In other embodiments, the charging cycle may be any other type of charging cycle (e.g., a two-stage charging cycle, a constant voltage, or a constant current charging cycle) appropriate for the specific device 112 coupled to the converter 106.

According to one embodiment, the controller 206 stores an identification of the current charging stage of the energy storage device 112 and an identification of the current state of the energy storage device 112 in memory. In such an embodiment, if the charging stage of the energy storage device 112 is interrupted (e.g., due to a power flow change at the bidirectional AC load terminal (e.g., Pac-out changing from positive to negative)), the previously stored charging stage of the energy storage device can be automatically retrieved (from memory) and implemented by the controller 206 in response to the converter again receiving power from the PV inverter 110 (i.e., Pac-out is positive). According to one embodiment, the controller 206 will automatically retrieve and implement the stored charging state when power is received from the PV inverter 110, unless the controller 206 identifies that the current state of the energy storage device 112 is different than the previously stored state of the energy storage device 112 (e.g., indicating that the energy storage device 112 was depleted providing power to the loads 114).

At block 306, based on the identified charging cycle of the energy storage device 112, the controller 206 operates the power conversion unit 204 to convert the AC power received at the bidirectional AC load terminal 210 (e.g., from the PV inverter 110) into the appropriate DC charging power (P_charge) and the DC charging power (P_charge) is provided to the energy storage device 112 to charge the energy storage device 112. The controller 206 operates the power conversion unit 204 (i.e., regulates the charging power) such that all "surplus" power not consumed by the loads 114 is converted into DC power and provided to the energy storage device 112.

At block 308, the controller 206 determines whether the absolute value of Pac_out is greater than P_charge. If the absolute value of Pac_out is greater than P_charge, the controller 206 identifies that the energy storage device 112 is fully charged. In response to a determination that the absolute value of Pac_out is not greater than P_charge, the controller 206 continues to operate the power conversion unit 204 to provide appropriate DC charging power to the energy storage device 112. In response to a determination that the absolute value of Pac_out is greater than P_charge, the charging operation of the power conversion unit 204 is paused and, at block 310, the controller 206 determines if the grid 102 is coupled to the power converter 106.

In response to a determination that the grid 102 is coupled to the power converter 106 (along with the prior determination that the power generated by the PV inverter 110 is in excess of what is required by the loads 114), at block 312, the controller 206 identifies the power (P_ac) that will be provided to the grid 102. For example, in one embodiment, P_ac is set equal to the difference between the excess power received from the PV inverter 110 (Pac_out) and the power provided to the energy storage device 112 (P_dc). However, in other embodiments, P_ac may be defined differently.

At block 314, the controller 206 determines if the power that will be provided to the grid (P_ac) complies with defined grid requirements (P_lim). In one embodiment, the grid requirements (P_lim) may include any number of different parameters to which P_ac is compared to confirm whether P_ac falls within the defined grid requirements (P_lim). For example, in at least one embodiment, the parameters defined in the grid requirements (P_lim) can include an "Overall Sell Energy" parameter that defines the integration of total power injected into the grid 102, an "Overall Sell Energy Period" parameter that defines the period over which the "Overall Sell Energy" parameter is integrated, a "Max Sell Energy" parameter that defines the maximum quantity of energy that can be provided to the grid 102, a "Max Sell Power" parameter that defines the maximum power that can be sold to the grid 102, and a "Sell Enable Interval" parameter that defines the time interval over which selling power to the gird 112 is enabled. In other embodiments, the grid requirements (P_lim) may include any number and/or type of parameter to which the power provided to the grid (P_ac) is compared.

According to one embodiment, the grid requirements (P_lim) are adjustable. For example, in one embodiment, a user may operate the power converter 106 and/or controller 206 (e.g., via an interface in communication with the controller 206) to adjust the grid requirements (P_lim). In another embodiment, the controller 206 may adjust the grid requirements (P_lim) automatically as a function of time, power/energy level, etc. According to another embodiment, the grid requirements (P_lim) are fixed and are not adjustable.

In response to a determination that P_ac complies with the defined grid requirements (P_lim), at block 316, the controller 206 operates the converter 106 to inject the excess power P_ac to the grid 102. In response to a determination that P_ac does not comply with the defined grid requirements (P_lim), at block 315, the controller 206 operates the converter 106 to disconnect itself from the grid 102, and at block 318, the controller 206 operates the power converter 106 to curtail the generation of power by the PV inverter 110. For example, in one embodiment, the controller 206 operates the converter 106 to shift the AC frequency at the bidirectional AC load terminal 210 such that the power output of the PV inverter 110 (coupled to the terminal 210 via the interface 108) is reduced. In other embodiments, the power generation of the PV inverter 110 may be reduced in some other appropriate way. Such a curtailment of power generated by the PV inverter 110 continues until the power that would be provided to the grid P_ac complies with the defined grid requirements (P_lim). Once P_ac complies with the defined grid requirements (P_lim), the curtailment of power generated by the PV inverter 110 stops and P_ac is injected to the grid 102.

In response to a determination, at block 310, that the grid 102 is not coupled to the power converter 106, the controller 206 also operates the power converter 106, at block 318, to curtail the generation of the power by the PV inverter 110. Such a curtailment will continue while the grid 102 is uncoupled from the power converter 106. Once the grid 102 is coupled to the converter 106, the controller 206 determines if the power that will be provided to the grid (P_ac) complies with defined grid requirements (P_lim) (e.g., as described above). If P_ac complies with the defined grid requirements (P_lim), P_ac is injected to the grid 102. If P_ac does not comply with the defined grid requirements (P_lim), the curtailment of power generated by the PV inverter 110 continues.

In response to a determination, at block 302, that Pac_out is negative (i.e., indicating that the loads 114 are consuming more power than the PV inverter 110 can generate), the charging operation of the power conversion unit 204 is paused and deficit power for the loads 114 (i.e., the power not able to be provided by the PV inverter 110) is drawn from the grid 102 (e.g., via bidirectional AC grid terminals 202) or supplied by the energy storage device 112 (e.g., via the bidirectional DC terminal 207 and power conversion unit 204) according to the grid support mode in place at the time the charging operation was suspended.

For example, at block 320, the controller 206 determines if the power converter 106 is coupled to the grid 102. In response to a determination that the converter 106 is not coupled to the grid 102, at block 322, the controller 206 operates the power conversion unit 204 to draw DC power from the energy storage device 112, convert the DC power into necessary AC power, and provide the converted AC power to the loads 114 (via the terminal 210 and interface 108) to account for the power deficiency of the PV inverter 110.

In response to a determination that the converter 106 is coupled to the grid 102, at block 324, the controller 206 identifies the grid support mode currently in place. The grid support mode defines how the controller 206 handles AC power received from the grid 102 and DC power received from the energy storage device 112 when there is a deficiency in power provided by the PV inverter 110. For example, in one embodiment, the current grid support mode defines, at block 326, that the power (P_dc) from the energy storage device 112 is equal to P_gs, and at block 328, that the output power (Pac_out) of the converter 106 is equal to the combination of the power (P_gs) from the energy storage device 112 and the power (P_ac) received from the grid 102. In another grid support mode embodiment, the output power (Pac_out) of the converter 106 is derived only from the AC power drawn from the grid 102. In another embodiment, the power converter 106 also provides DC power to the energy storage device 112 (to charge the energy storage device) derived from the AC power drawn from the grid 102. In other embodiments, the grid support modes may be defined in any other appropriate way.

Figure 4:
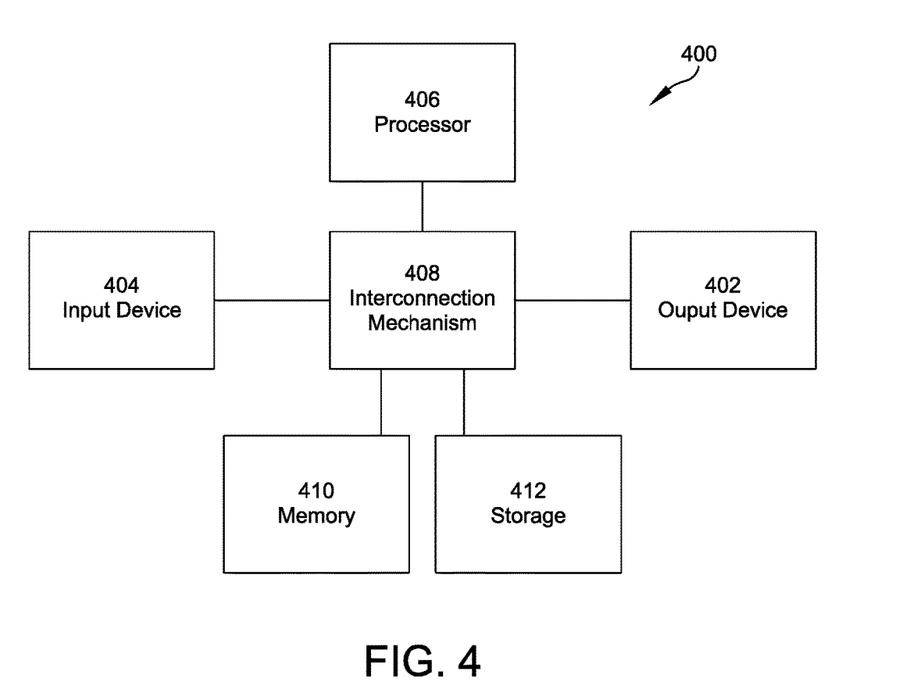
FIG. 4 is a block diagram of a system upon which various embodiments of the invention may be implemented.

FIG. 4 illustrates an example block diagram of computing components forming a system 400 which may be configured to implement one or more aspects disclosed herein. For example, the system 400 may be communicatively coupled to the controller 206, included within the controller 206, coupled to the converter 106, or included within the converter 106. The system 400 may also be configured to operate the power converter 106 as discussed above.

The system 400 may include for example a computing platform such as those based on Intel PENTIUM-type processor, Motorola PowerPC, Sun UltraSPARC, Texas Instruments-DSP, Hewlett-Packard PA-RISC processors, or any other type of processor. System 400 may include specially-programmed, special-purpose hardware, for example, an application-specific integrated circuit (ASIC). Various aspects of the present disclosure may be implemented as specialized software executing on the system 400 such as that shown in FIG. 4.

The system 400 may include a processor/ASIC 406 connected to one or more memory devices 410, such as a disk drive, memory, flash memory or other device for storing data. Memory 410 may be used for storing programs and data during operation of the system 400. Components of the computer system 400 may be coupled by an interconnection mechanism 408, which may include one or more buses (e.g., between components that are integrated within a same machine) and/or a network (e.g., between components that reside on separate machines). The interconnection mechanism 408 enables communications (e.g., data, instructions) to be exchanged between components of the system 400. The system 400 also includes one or more input devices 404, which may include for example, a keyboard or a touch screen. The system 400 includes one or more output devices 402, which may include for example a display. In addition, the computer system 400 may contain one or more interfaces (not shown) that may connect the computer system 400 to a communication network, in addition or as an alternative to the interconnection mechanism 408.

The system 400 may include a storage system 412, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 410 that allows for faster access to the information by the processor/ASIC than does the medium. This memory 410 may be a volatile, random access memory such as a dynamic random access memory (DRAM) or static memory (SRAM). It may be located in storage system 412 or in memory system 410. The processor 406 may manipulate the data within the integrated circuit memory 410 and then copy the data to the storage 412 after processing is completed. A variety of mechanisms are known for managing data movement between storage 412 and the integrated circuit memory element 410, and the disclosure is not limited thereto. The disclosure is not limited to a particular memory system 410 or a storage system 412.

The system 400 may include a computer platform that is programmable using a high-level computer programming language. The system 400 may be also implemented using specially programmed, special purpose hardware, e.g. an ASIC. The system 400 may include a processor 406, which may be a commercially available processor such as the well-known Pentium class processor available from the Intel Corporation. Many other processors are available. The processor 406 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

As described above, the power converter 106 is utilized with a PV inverter 110; however, in other embodiments, the power converter 106 is utilized with another type of renewable energy based inverter (e.g., solar, wind, etc.) or some other type of inverter. Such a converter 106 can be utilized in a residential, commercial, or utilities based system.

As also described above, the controller 206 monitors the output power (Pac_out) of the converter 106; however, in other embodiments, the controller 206 may also monitor the AC power (P_ac) provided by the grid 102 and operated the converter 106 based on P_ac.

As described above, the converter 106 is coupled to a single energy storage device 112; however, in other embodiments, the converter 106 may be coupled to any number of energy storage devices/systems. As also discussed above, the converter 106 is coupled to a single PV inverter 110; however, in other embodiments, the bidirectional AC load terminal 210 of the converter 106 can be coupled to any number of PV inverters via the interface 108.

As described above, the converter 106 includes a single embedded controller 206; however, in other embodiments, the converter 106 can include any number of controllers.

As discussed above, a self-regulated power converter is provided that is capable of receiving AC power directly from a PV inverter, enabling self-consumption of locally generated electric power (i.e., PV electric power) while achieving smart control of the charge/discharge cycles of an energy storage device coupled to the converter, and enabling the control of energy sold to an AC grid. The self-regulated power converter includes an embedded controller that provides cost-effective and efficient energy management control between an AC grid, the PV inverter, an energy storage device coupled to the converter, and any loads coupled to the converter. By performing energy management between the AC grid, the PV inverter, the energy storage device, and the loads with the embedded controller, as described above, the external communication cables typically required between components of a power system to ensure proper energy management can be suppressed. In addition, as there are less devices and components in the system, the reliability and efficiency of the system may also be improved.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only

What is claimed is:

1. A power converter comprising:
   at least one bidirectional AC grid terminal configured to be coupled to an AC grid;
   a bidirectional AC load terminal configured to be coupled to at least one Photo-Voltaic (PV) inverter and at least one load;
   a power conversion unit coupled to the at least one bidirectional AC grid terminal and the bidirectional AC load terminal;
   a bidirectional DC terminal configured to be coupled to an energy storage device; and
   a controller coupled to the power conversion unit and the bidirectional AC load terminal and configured to:
      monitor at least one of current and voltage at the bidirectional AC load terminal;
      determine, based on the monitoring, whether the power converter is receiving AC power from the at least one PV inverter or whether AC power is being drawn from the power converter by the at least one load;
      determine whether the energy storage device is fully charged; and
      in response to a determination that the power converter is receiving power from the at least one PV inverter and a determination that the energy storage device is not fully charged, operate the power conversion unit to convert the AC power received from the at least one PV inverter into DC power and provide the DC power to the bidirectional DC terminal to charge the energy storage device.

2. The power converter of claim 1, wherein in operating the power conversion unit to convert the AC power received from the at least one PV inverter into DC power and provide the DC power to the bidirectional DC terminal, the controller is further configured to:
   identify a charging cycle specific to the energy storage device; and
   operate the power conversion unit to charge the energy storage device in a charging stage based on the charging cycle specific to the energy storage device.

3. The power converter of claim 2, wherein in identifying a charging cycle specific to the energy storage device, the controller is further configured to identify the charging cycle as one of a 3-stage, 2-stage, constant current, and constant voltage charging cycle.

4. The power converter of claim 2, wherein the controller is further configured to store an identification of the charging stage and an identification of a state of the energy storage device in memory.

5. The power converter of claim 4, wherein in response to a determination that the power converter is receiving power from the at least one PV inverter, the controller is further configured to:
   retrieve the previously stored identification of the charging stage and the previously stored identification of the state of the energy storage device from memory;
   compare the previously stored identification of the state of the energy storage device with a current identification of the state of the energy storage device; and
   operate the power conversion unit to charge the energy storage device in the charging stage in response to a determination that the previously stored identification of the state of the energy storage is the same as the current identification of the state of the energy storage device.

6. The power converter of claim 1, wherein the controller is further configured to determine whether the at least one bidirectional AC grid terminal is coupled to the AC grid.

7. The power converter of claim 6, wherein in response to the determination that the power converter is receiving power from the at least one PV inverter, a determination that the energy storage device is fully charged, and a determination that the at least one bidirectional AC grid terminal is coupled to the AC grid, the controller is further configured to operate the power converter to provide the AC power received from the at least one PV inverter to the AC grid via the at least one bidirectional AC grid terminal.

8. The power converter of claim 7, wherein in operating the power converter to provide the AC power received from the at least one PV inverter to the AC grid, the controller is further configured to:
determine whether the AC power received from the at least one PV inverter complies with at least one grid requirement; and
in response to a determination that the AC power received from the at least one PV inverter complies with the at least one grid requirement, operate the power converter to provide the AC power received from the at least one PV inverter to the AC grid.

9. The power converter of claim 8, wherein the at least one grid requirement defines a period of time in which the AC power received from the at least one PV inverter can be provided to the AC grid.

10. The power converter of claim 8, wherein in response to a determination that the AC power received from the at least one PV inverter does not comply with the at least one grid requirement, the controller is further configured to operate the power converter to disconnect from the AC grid and shift an AC frequency at the bidirectional AC load terminal such that the AC power received from the at least one PV inverter is reduced.

11. The power converter of claim 6, wherein in response to the determination that the power converter is receiving power from the at least one PV inverter, the determination that the energy storage device is fully charged, and a determination that the at least one bidirectional AC grid terminal is not coupled to the AC grid, the controller is further configured to operate the power converter to shift an AC frequency at the bidirectional AC load terminal such that the AC power received from the at least one PV inverter is reduced.

12. The power converter of claim 6, wherein in response to a determination that AC power is being drawn from the power converter by the at least one load and a determination that the at least one bidirectional AC grid terminal is not coupled to the AC grid, the controller is further configured to operate the power conversion unit to draw DC power from the energy storage device via the bidirectional DC terminal, convert the DC power into output AC power, and provide the output AC power to the at least one load via the bidirectional AC load terminal.

13. The power converter of claim 6, wherein in response to a determination that AC power is being drawn from the power converter by the at least one load and a determination that the at least one bidirectional AC grid terminal is coupled to the AC grid, the controller is further configured to operate the power converter to draw AC power from the AC grid and provide the AC power from the AC grid to the at least one load via the bidirectional AC load terminal.

14. The power converter of claim 13, wherein in response to a determination that AC power is being drawn from the power converter by the at least one load, a determination that the at least one bidirectional AC grid terminal is coupled to the AC grid, and a determination that the energy storage device is not fully charged, the controller is further configured to operate the power conversion unit to convert the AC power from the AC grid into DC power and provide the DC power to the bidirectional DC terminal to charge the energy storage device.

15. The power converter of claim 13, wherein in response to a determination that AC power is being drawn from the power converter by the at least one load, a determination that the at least one bidirectional AC grid terminal is coupled to the AC grid, and a determination that the energy storage device is not fully charged, the controller is further configured to operate the power converter to draw AC power from the AC grid and provide the AC power from the AC grid to the at least one load via the bidirectional AC load terminal.

16. The power converter of claim 1, further comprising at least one sensor coupled to the controller and the bidirectional AC load terminal.

17. A method for operating a power converter having at least one bidirectional AC grid terminal configured to be coupled to an AC grid, a bidirectional AC load terminal configured to be coupled to at least one Photo-Voltaic (PV) inverter and at least one load, a power conversion unit coupled to the at least one bidirectional AC grid terminal and the bidirectional AC load terminal, and a bidirectional DC terminal configured to be coupled to an energy storage device, the method comprising acts of:
monitoring at least one of current and voltage at the bidirectional AC load terminal;
determining, based on the act of monitoring, whether the power converter is receiving AC power from the at least one PV inverter or whether AC power is being drawn from the power converter by the at least one load;
determining whether the energy storage device is fully charged; and
in response to a determination that the power converter is receiving power from the at least one PV inverter and a determination that the energy storage device is not fully charged, operating the power conversion unit to convert the AC power received from the at least one PV inverter into DC power and provide the DC power to the bidirectional DC terminal to charge the energy storage device.

18. The method of claim 17, wherein operating the power conversion unit to convert the AC power received from the at least one PV inverter into DC power and provide the DC power to the bidirectional DC terminal includes:
identifying a charging cycle specific to the energy storage device; and
operating the power conversion unit to charge the energy storage device based on the charging cycle specific to the energy storage device.

19. The method of claim 17, further comprising:
determining whether the at least one bidirectional AC grid terminal is coupled to the AC grid;
in response to a determination that the power converter is receiving power from the at least one PV inverter, a determination that the energy storage device is fully charged, and a determination that the at least one bidirectional AC grid terminal is coupled to the AC grid, operating the power converter to provide the AC power received from the at least one PV inverter to the AC grid via the at least one bidirectional AC grid terminal; and
in response to the determination that the power converter is receiving power from the at least one PV inverter, the determination that the energy storage device is fully charged, and a determination that the at least one bidirectional AC grid terminal is not coupled to the AC grid, operating the power converter to curtail the power received from the at least one PV inverter.

20. The method of claim 19, wherein operating the power converter to provide the AC power received from the at least one PV inverter to the AC grid includes:
   determining whether the AC power received from the at least one PV inverter complies with at least one grid requirement;
   in response to a determination that the AC power received from the at least one PV inverter complies with the at least one grid requirement, operating the power converter to provide the AC power received from the at least one PV inverter to the AC grid; and
   in response to a determination that the AC power received from the at least one PV inverter does not comply with the at least one grid requirement, operating the power converter to curtail the AC power received from the at least one PV inverter.

21. The method of claim 19, further comprising:
   in response to a determination that AC power is being drawn from the power converter by the at least one load and a determination that the at least one bidirectional AC grid terminal is not coupled to the AC grid, operating the power conversion unit to draw DC power from the energy storage device via the bidirectional DC terminal, convert the DC power into output AC power, and provide the output AC power to the at least one load via the bidirectional AC load terminal.

22. The method of claim 19, further comprising:
   in response to a determination that AC power is being drawn from the power converter by the at least one load and a determination that the at least one bidirectional AC grid terminal is coupled to the AC grid, operating the power converter to draw AC power from the AC grid and provide the AC power from the AC grid to the at least one load via the bidirectional AC load terminal.

23. A power supply system comprising:
   a first interface configured to be coupled to an AC grid;
   a second interface configured to be coupled to at least one load;
   a power converter coupled to the first interface and the second interface;
   a renewable energy based inverter coupled to the second interface;
   an energy storage device coupled to the power converter; and
   means for determining if power generated by the renewable energy based inverter is sufficient to power the at least one load, for operating the power converter to charge the energy storage device with excess power generated by the renewable energy based inverter if the power generated by the renewable energy based inverter exceeds power required by the at least one load and the energy storage device is not fully charged, for operating the power converter to provide the excess power generated by the renewable energy based inverter to the AC grid if the energy storage device is fully charged, and for operating the power converter to provide AC power from the AC grid to the at least one load if the power generated by the renewable energy based inverter is less than the power required by the at least one load.

\* \* \* \* \*